United States Patent [19]

Mairot et al.

[11] Patent Number: 4,582,151

[45] Date of Patent: Apr. 15, 1986

[54] WEIGHING APPARATUS

[75] Inventors: Guy Mairot, Vétraz-Monthoux; Claude Perruche, Douvaine, both of France

[73] Assignee: S.C.A.I.M.E., Annemasse, France

[21] Appl. No.: 679,271

[22] Filed: Dec. 7, 1984

[30] Foreign Application Priority Data

Dec. 7, 1983 [CH] Switzerland .......................... 6550/83

[51] Int. Cl.[4] ...................... G01G 19/52; G01G 21/28
[52] U.S. Cl. ..................................... 177/144; 177/244
[58] Field of Search ................................ 177/144, 244

[56] References Cited

U.S. PATENT DOCUMENTS

| | | | |
|---|---|---|---|
| 612,505 | 10/1898 | Post | 177/144 |
| 4,522,275 | 6/1985 | Anderson | 177/144 X |

*Primary Examiner*—George H. Miller, Jr.
*Attorney, Agent, or Firm*—Ladas & Parry

[57] ABSTRACT

A weighing apparatus designed to be included into an element insertable beneath a bench comprising a covering plate (2) resting by two of its sides on at least one face of the insertable element, a weighing scale (3), a readout panel (4), means for displaying the measured weight located in the plane of the upper surface of the plate (2). The edge of said upper surface fits with the edge of the upper surface of said element and the plate (2) is used as supporting means for the weighing mechanism.

7 Claims, 4 Drawing Figures

WEIGHING APPARATUS

The present invention concerns a weighing apparatus such as a kitchen or a laboratory balance.

These instruments are communly used in many kitchens and industrial laboratories. The lack of room on the benches where the work is carried out often prevent the weighing apparatus from being allocated a permanent place. As a result, the user often has to walk to the weighing apparatus, or to move the weighing apparatus, which can be disruptive to its ordely functioning and necessitate adjustments before each weighing operation. Further, when weighing apparatus are used in such locations as kitchens or laboratories, they have to be put away into cupboards to avoid their possible contaminations by vapours and by liquid or solid projections which could be corrosive. No satisfactory answer has been given up to now to these problems.

The object of the present invention is a weighing apparatus which obviates the disadvantages described above in an original manner. More specifically, the object of the present invention is a weighing apparatus designed to be included into an element insertable for example beneath a kitchen or a laboratory bench. The invention is defined in the appended claims.

The apparatus according to the present invention is cheap and easy to build, and can conveniently be adapted to the insertable elements which are used at present to equip kitchens and laboratories. Because of its original construction, the weighing apparatus according to the present invention can be provided without such usual components as for example the base or certain parts of the frame. The appended drawings illustrate by way of examples several embodiments of the apparatus of the present invention, but in no manner they limit the scope of the invention.

Figure 1:
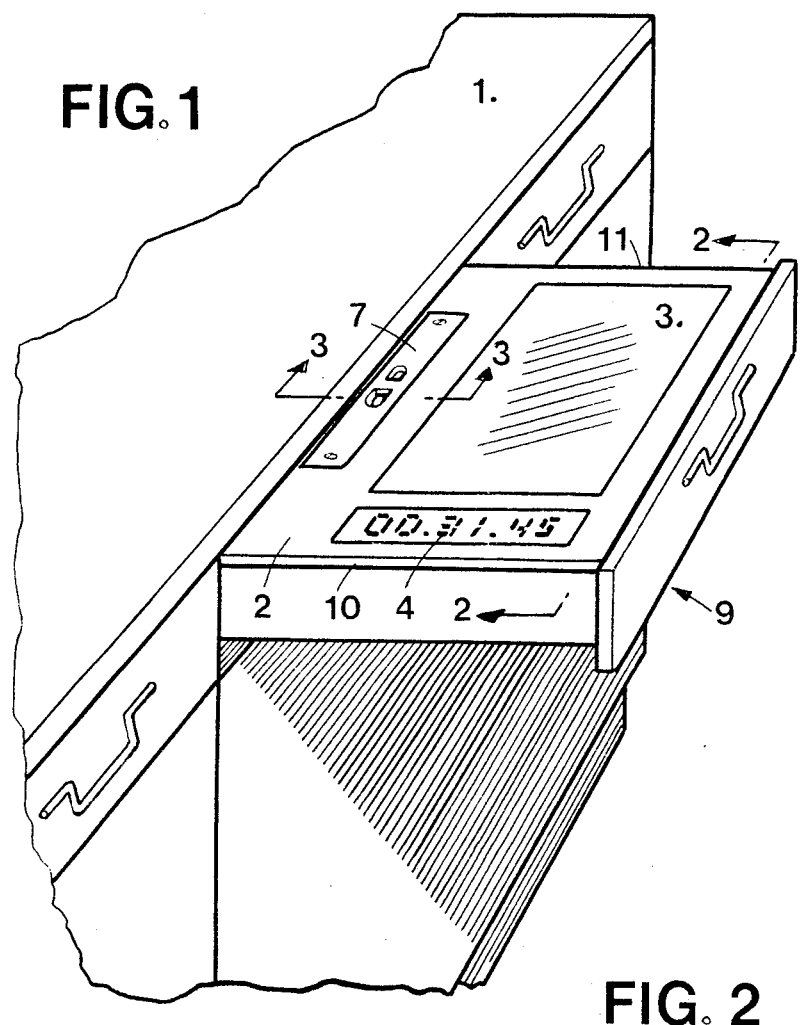
FIG. 1 is a general view of an embodiment of the invention showing a weighing apparatus included into an insertable element.
Figure 2:
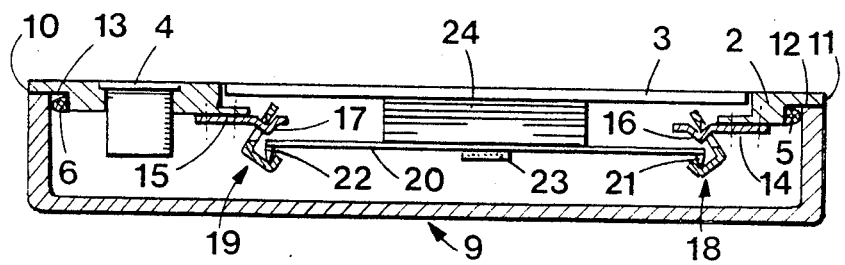
FIG. 2 is a cross-sectional view taken along the line 2—2 of FIG. 1.
Figure 3:
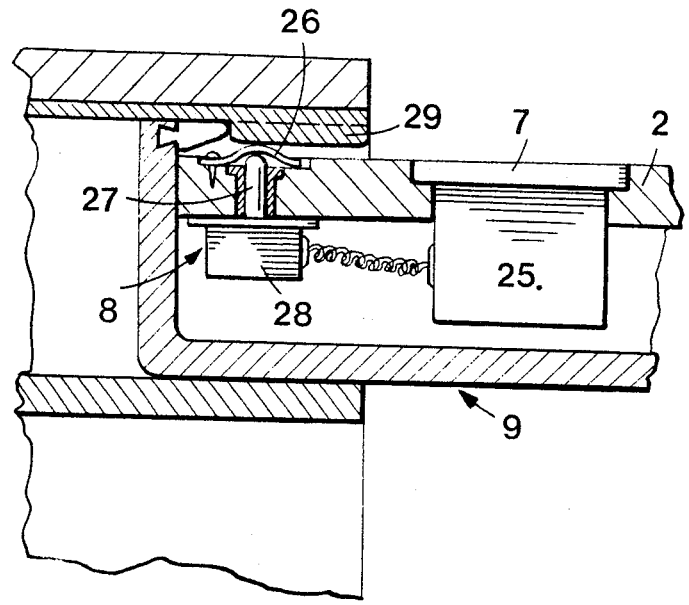
FIG. 3 is a cross-sectional view taken along the line 3—3 of FIG. 1.
Figure 4:
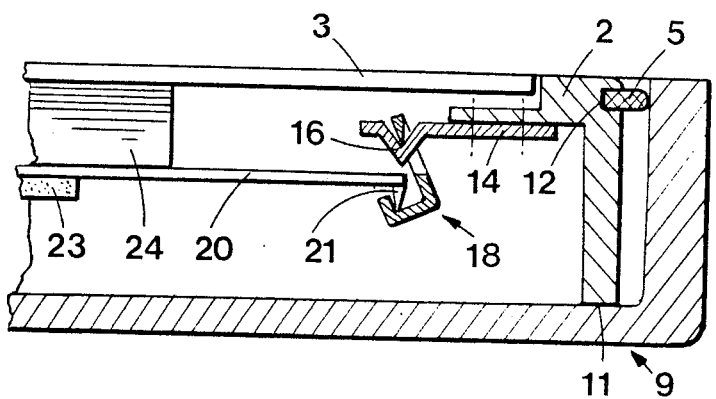
FIG. 4 is a partially cross-sectional view of another embodiment of the invention.

The weighing apparatus according to the invention comprises a covering plate 2 resting at least by two of its sides 10, 11, on at least one of the faces of the insertable element 9. In the embodiment illustrated on FIGS. 1 and 2, said plate 2 is found resting on two of the sides of the element 9, while in the embodiment illustrated on FIG. 4, it rests on the lower face i.e. on the bottom of said element 9. It is understood that the plate can also rest by more than two of its edges on more than two faces of the insertable element.

The size of the plate 2 is selected so that its edge should fit with the edges of the upper surface of the element 9. As shown on FIGS. 1 and 2, the plate 2 can be located in the same plane as the upper surface of the element 9, this plate can also be located lower, with the scale 3 and the readout panel 4 remaining in the same plane as the upper surface of the plate 2.

Although the modern insertable elements such as drawers for example are generally made in standard sizes, an accurate adjustment of the plate 2 in the element 9 can be sometimes necessary. For this purpose, the plate can be advantageously provided with means which make such an adjustment possible. In one of the embodiments of the invention, such means consist of the seals 5 and 6 made of a flexible material such as felt or a polymer, which are stuck respectively on the shoulders 12 and 13 provided in the plate 2: the desired effect is obtained by the pressure the seals exert between said plate and the side faces of the element 9. These seals can further provide a protection against impacts. Other positioning means can also be considered, such as springs or spacing screws for example. Depending on the nature of the material from which the plate 2 is made and depending on the shape of its edges, the plate 2 may not require any additional positioning means. The elasticity of the plate may be sufficient to achieve the desired effect.

The weighing apparatus according to the invention consists of an electronic balance with a digital readout where the covering plate 2 acts as a means for suspending the weighing mechanism, thereby advantageously avoiding the use of a base for supporting said mechanism, which reduces the number of components of the apparatus. In one of the embodiments given by way of example, two supporting elements 14 and 15 appropriately fixed to the bottom of the plate 2 are provided respectively with the folds 16 and 17 which cooperate with respectively the mobile knives 18 and 19. The knives 18 and 19 support a blade 20 with the fixed knives 21 and 22 located at its two ends. The lower surface of said blade is provided preferably at its center with one or several stress gauges which are connected by known means (not shown on the appended drawings) to a device for measuring the weight. The plate 3 is supported by said blade 20 through known means such as the spacing element 24.

Other suspending means, in particular those designed for use in electronic balances could be considered. The readout system of the balance consists of known means, of which only the pannel 4 is shown. Means 7 for acceding to the power supply unit 25 are equally located in the same plane as the upper surface of the plate 2 so as to allow an easy replacement of the power supply, such as a battery when it is flat. Such means can comprise a lid which is held in position for example by insertion or by screws.

The weighing apparatus of the invention can advantageously further comprise means 8 for switching on the power supply when the element 9 is pulled out. These means can comprise a switch such as illustrated for example on FIG. 4. An elastic membrane 26 covers a pin 27 placed inside a housing to cooperate with a mecanism 28 connected by known means to the power supply unit 25. When the element 9 is pulled out (FIG. 4) the membrane 26 is pushed down by the projecting element 29 thereby pushing down the pin 27 and switching on the weighing apparatus. When the element 9 is pushed back, the membrane 26 and the pin 27 resume their initial position, thereby switching off the apparatus. It is understood that any other suitable means such as an electro-mechanical device or an electro-magnetique device can be used for this purpose.

The insertable element 9 can be a removable casing such as a drawer fitted by known means under the bench 1. Such an element 9 comprising a weighing apparatus as defined above is also an object of the present invention.

We claim:

1. A weighing apparatus designed to be incorporated into an element insertable beneath a bench, characterized in that it comprises a covering plate (2) resting by two of its sides on at least one face of said element, a weighing scale (3), a readout panel (4), means for displaying the measured weight located in the plane of the upper surface of the plate (2), and in that the edge of said upper surface fits with the edge of the upper surface of said element, and in that said plate (2) is used as supporting means for the weighing scale.

2. A weighing apparatus according to claim 1, characterized in that it consists in an electronic balance with a digital readout.

3. A weighing apparatus according to claim 1, characterized in that it comprises means for positioning the plate (2) in the insertable element.

4. A weighing apparatus according to claim 1, characterized in that it further comprises means (7) for acceding to the power supply unit located in a plane of the upper surface of the plate (2).

5. A weighing apparatus according to claim 1 characterized in that it comprises means for switching on the power supply when the insertable element is pulled out, said power supply being switched off when the insertable element is pushed back.

6. An element insertable beneath a bench characterized in that it comprises a removable casing containing a weighing apparatus such as defined in claim 1.

7. Insertable element according to claim 6 characterized in that said casing is a drawer.

* * * * *